United States Patent [19]

Nebu et al.

[11] Patent Number: 4,699,232

[45] Date of Patent: Oct. 13, 1987

[54] EXHAUST PIPE COVER FOR MOTORCYCLES

[75] Inventors: Hideaki Nebu, Saitama; Katsusuke Komuro, Tokyo; Toshiyuki Yamada, Saitama, all of Japan

[73] Assignee: Honda Giken Kogyo Kabushiki Kaisha, Tokyo, Japan

[21] Appl. No.: 874,592

[22] Filed: Jun. 16, 1986

[30] Foreign Application Priority Data

Jun. 14, 1985 [JP] Japan ............................ 60-89961[U]

[51] Int. Cl.$^4$ .............................................. B60K 13/00

[52] U.S. Cl. ................................... 180/219; 180/225; 180/296; 180/309

[58] Field of Search ................ 180/219, 225, 296, 309

[56] References Cited

U.S. PATENT DOCUMENTS 2,875,841 3/1959 Henderson .......................... 180/296

4,550,794 11/1985 Inoue et al. ......................... 180/219

*Primary Examiner*—David M. Mitchell

*Assistant Examiner*—Kenneth R. Rice

*Attorney, Agent, or Firm*—Lyon & Lyon

[57] ABSTRACT

A motorcycle of the type having horizontally opposed cylinder blocks and rearwardly extending exhaust pipes therefrom having a cover on either side of the vehicle extending from around the underside of the cylinder blocks to at least below the rearwardmost footrest. The cover is a U-shaped cross-sectional structure with an upper side, a lower side and an outward side. A rear wall extends downwardly from immediately behind the cylinder blocks to direct the hot air around the exhaust pipes at the engine downwardly and rearwardly.

11 Claims, 3 Drawing Figures

EXHAUST PIPE COVER FOR MOTORCYCLES

BACKGROUND OF THE INVENTION

The field of the present invention is covers for exhaust pipes for motorcycles.

In large motorcycles, multi-cylinder engines are common which include left hand and right hand cylinder blocks which extend laterally to either side of the vehicle. Exhaust pipes for such vehicles are generally arranged to extend reawardly along the lower part of the frame beneath the footrests of the rider or riders which footrests also extend laterally from the vehicle.

The foregoing arrangement has an inherent disadvantage in that the feet of the rider or riders can become hot because of the close proximity of the exhaust pipes. The heat from the exhaust may be conveyed rearwardly from the portion of the pipes forwardly of the rider's feet due to the forward motion of the vehicle. Naturally, the portion of the exhaust pipes immediately beneath the feet of the rider or riders also would contribute to the problem.

SUMMARY OF THE INVENTION

The present invention is directed to a cover to be employed in conjunction with the exhaust pipes of motorcycles having laterally extending cylinder blocks. Covers designed in accordance with the present invention are adapted to prevent the heat of the exhaust pipes from radiating toward or flowing past the feet of the riders.

In accordance with the present invention, a cover is employed which extends between the footrest on such a motorcycle and the exhaust pipes thereof. The cover also extends downwardly to the outer side of the exhaust pipes. Spacing is provided arounded the exhaust pipes within the cover such that air flow may cool the exhaust pipes and remove heat from the system. In an additional aspect of the present invention, a downwardly extending rear cover positioned just behind the cylinder blocks prevents further flow of hot air from the portion of the exhaust pipes adjacent to the cylinder blocks rearwardly to the area of the footrests by diverting the heated air in a direction away from the footrests. In yet a further aspect of the present invention, an inlet may be provided at the forward end of the cover with a corresponding outlet at the rear end of the cover to enhance air flow therethrough. With cylinder blocks extending to either side of the engine a cover to either side of the engine over parallel exhaust pipes is contemplated.

Accordingly, it is an object of the present invention to provide an improved exhaust system capable of directing the exhaust heat away from the rider or riders. Other and further objects and advantages will appear hereinafter.

DETAILED DESCRIPTION OF THE PREFERRED EMBODIMENT

Figure 1:
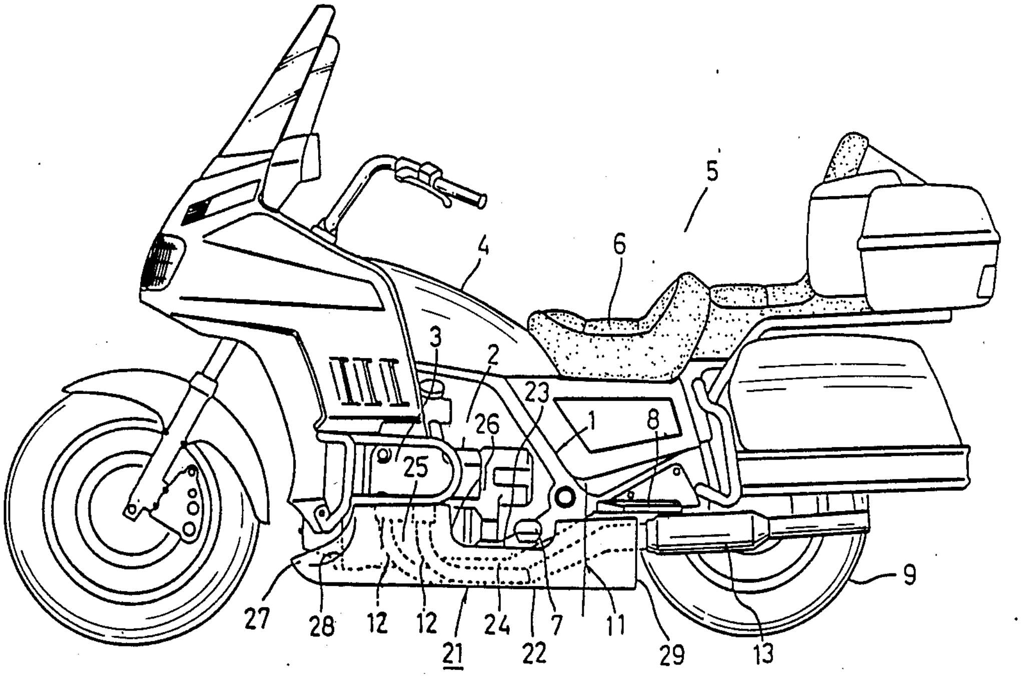
FIG. 1 is a side elevation view of a motorcycle employing an exhaust system of the present invention.
Figure 2:
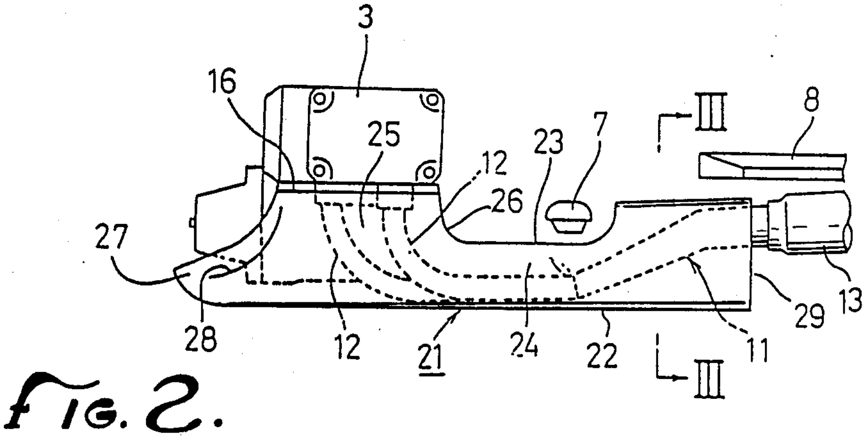
FIG. 2 is a detailed side elevation view of the exhaust system of the present invention.
Figure 3:
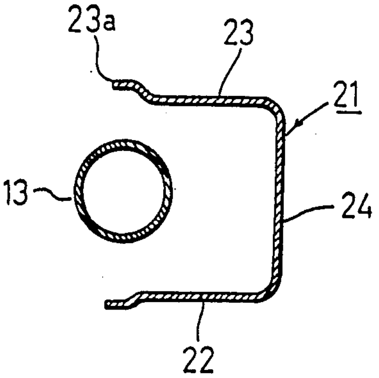
FIG. 3 is a cross-sectional view taken along line III—III of FIG. 2.

Turning in detail to the drawings, a relatively large motorcycle is illustrated having a horizontally opposed four cylinder engine 2 mounted to a central portion of a frame 1. A dummy fuel tank 4 is placed on the upper front portion of the frame 1 above the engine 2. A tandem seat, generally designated 5, is placed on the upper rear portion of the frame 1 rearwardly of the dummy tank 4. On the lower part of the frame 1 under the driver's seat 6 at the front thereof are rider's footrests 7 which are symmetrically placed on either side of the vehicle. Rearwardly therefrom are a second pair of rider footrests 8 for riders sitting in the back portion of the tandem seat 5. Exhaust pipes 11 are located on either side of the motorcycle and extend rearwardly from the cylinder blocks extending laterally outward on either side of the engine 2. As shown in FIG. 1, there are two cylinders on each side of the engine and each includes an exhaust pipe 12 which is bent rearwardly such that it is placed along the lower side of the frame. The two pipes 12 are then collected at a muffler 13 right below the rearward most footrests. The muffler is bent upwardly and then extends rearwardly to one side of the rear wheel 9.

The forward pair of footrests 7 extending laterally from the motorcycle are located in a position below the level of the underside of the cylinder blocks 3 and are also located rearwardly of the front portions of the exhaust pipes 12 where they are connected to the underside of the cylinder blocks 3. Thus, both sets of footrests 7 and 8 are found to be adjacent, above and rearwardly of the exhaust system which can become quite hot during operation.

To thermally isolate the exhaust system from the footrests 7 and 8, an exhaust pipe cover 21 is provided. The exhaust pipe cover 21 is generally arranged in a U-shaped cross-sectional configuration with a lower wall 22, and upper wall 23 and an outside wall 24. The cover opens inwardly toward the center of the motorcycle and the front portion of the cover 21 is formed to extend upwardly to surround the forward portion of the exhaust pipes on the outer side and back thereof. The cover includes a rear wall 26 and a front wall 27 to either side of an upper front portion 25 of the outside wall 24. The rear wall 26 extends downwardly and then joins with the upper wall 23 which extends rearwardly to at least beneath the rear footrests 8. The front wall 27 is inclined upwardly and rearwardly from forwardly of the cylinder block 3 and air inlet 28 is located on the front wall 27 to receive air which may pass through the cover to cool the exhaust pipes therein.

The upper edges of the rear wall 26, the outside front portion 25 of the outside wall 24 and the front wall 27 are attached to the underside of the cylinder block 3 on each side of the motorcycle. Sealing material 16 is placed between this front portion of the cover 21 and the engine cylinder blocks 3. The exhaust pipes 12 are located within the cover 21 and are spaced from the walls thereof. The inner edge **23*a* of the upper wall 23 is joined with the engine block with the sealing material therebetween. The opening 29 at the rear end of the cover 21 is found right under the passenger footrests 8 with the front part of the muffler 13 being joined with the pipes 12 at the rear part of the cover 21**.

Because of the cover 21, the exhaust pipes 11 are covered from their forwardmost portion to right under the passenger footrests 8 to eliminate the heat of the exhaust pipes 11 from affecting the feet of riders on the motorcycle.

Because of the inlet 28, the outlet 29 and the spacing provided about the exhaust pipes 12 by the cover 21, air may flow through the cover to both cool the exhaust pipes and insulate the area surrounding the pipes. Hot air may then be exhausted downwardly and rearwardly from the area about the underside of the cylinder blocks 3 and out the outlet 29. This functional result can, alternatively, be accomplished with only an upper wall and an outer wall even without the lower wall employed to form the channel-like cross-sectional structure described herein.

Thus, a design has been presented which overcomes the difficulty in motorcycles having laterally extending cylinder blocks by covering the hot exhaust pipes from the footrests of the vehicle and yet allowing air flow therethrough for cooling the exhaust pipes themselves.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed:

1. For use in a motorcycle having an engine including a cyclinder block, a footrest positioned rearwardly of said cylinder block and an exhaust pipe extending rearwardly from said cylinder block in underlying relation to said footrest, an exxhaust pipe cover separating said exhaust pipe from said footrest comprising wall means disposed about said exhaust pipe and forming a flow passage for directing cooling air in heat exchange relation with said exhaust pipe, said wall means including means for diverting air heated by said exhaust pipe in a direction away from said footrest.

2. The organization as recited in claim 1 in which said heated air diverting means directs said heated air laterally of the longitudinal axis of said exhaust pipe cover.

3. The organization as recited in claim 2 in which said wall means include a top wall interposed between said exhaust pipe and said footrest and a side wall depending downwardly from said top wall, said top wall including a first portion substantially coextensive with said cylinder block, a second portion vertically displaced from said first portion and extending in underlying relation to said footrest and a rear wall portion extending between said first portion and said second portion and forming a baffle surface for diverting cooling air heated by said exhaust pipe downwardly away from said second portion.

4. The organization as recited in claim 3 in which said wall means further include a bottom wall displaced inwardly from said side wall in underlying relation to said exhaust pipe.

5. The organization as recited in claim 4 in which said bottom wall is substantially coextensive with said side wall and said wall means cooperate to define an exhaust pipe cover having a substantially U-shaped cross section along its length.

6. An exhaust system for a motorcycle having an engine including generally laterally extending cylinder blocks, a plurality of longitudinally spaced, laterally extending footrests disposed rearwardly of said cylinder blocks, exhaust pipe means connecting with said cylinder blocks and extending rearwardly from said cylinder blocks in underlying relation to said footrests, an exhaust pipe cover comprising wall means substantially coextensive with said exhaust pipe disposed between said exhaust pipe and said footrests and forming a flow passage for conducting cooling air in heat exchange relation with said exhaust pipe, said wall means including means for diverting air heated by said exhaust pipe in a direction away from said footrests.

7. The organization as recited in claim 6 in which said heated air diverting means directs said heated air laterally of the longitudinal axis of said exhaust pipe cover.

8. The organization as recited in claim 7 in which said wall means include a top wall interposed between said exhaust pipe and said footrests and a side wall depending downwardly from said top wall, said top wall including a first portion substantially coextensive with said cylinder block, a second portion vertically displaced from said first portion and extending in underlying relation to the forwardmost of said footrests and a rear wall portion extending between said first portion and said second portion and forming a baffle surface for diverting cooling air heated by said exhaust pipe downwardly away from said second portion.

9. The organization as recited in claim 8 in which said exhaust system includes a muffler connected to said exhaust pipe, the other of said footrests being positioned superjacent said muffler and in which said top wall includes a third portion vertically displaced from said second portion and interposed between said exhaust pipe and said other footrest.

10. The organization as recited in claim 9 in which said wall means further include a bottom wall diplaced inwardly from said side wall in underlying relation to said exhaust pipe.

11. The organization as recited in claim 10 in which said bottom wall is substantially coextensive with said side wall and said wall means cooperate to define an exhaust pipe cover having a substantially U-shaped cross section along its length.

* * * * *